United States Patent [19]

Lacan

[11] Patent Number: 5,249,544
[45] Date of Patent: Oct. 5, 1993

[54] SYSTEM OF INTERDEPENDENT STOPPERS FOR WINDWARD SHEETING TRAVELER CARS

[76] Inventor: Guy H. Lacan, 19, rue des Champs Fleuris, 78600 Le Mesnil Le Roi, France

[21] Appl. No.: 896,693
[22] Filed: Jun. 10, 1992

[30] Foreign Application Priority Data

Jun. 11, 1991 [FR] France ................... 9107053
Jul. 4, 1991 [FR] France ................... 9108359

[51] Int. Cl.$^5$ ............................................. B63B 21/24
[52] U.S. Cl. ..................................... 114/204; 114/218
[58] Field of Search ............... 114/108. 109, 111, 112, 114/204, 218

[56] References Cited

U.S. PATENT DOCUMENTS

| 4,147,121 | 3/1992 | Fogh ................................ 114/204 |
| 4,651,668 | 3/1987 | Melrose ........................... 114/204 |

FOREIGN PATENT DOCUMENTS

| 26602092 | 1/1976 | Fed. Rep. of Germany . |
| 3035951A1 | 9/1980 | Fed. Rep. of Germany . |
| 3044492A1 | 11/1990 | Fed. Rep. of Germany . |

Primary Examiner—Jesûs D. Sotelo
Attorney, Agent, or Firm—Browdy and Neimark

[57] ABSTRACT

A system of interdependent stoppers for the two tackles which control the position of a mainsail traveler car moving along a trackway, mounted transversally across a sailboat. It comprises two pivoting block cleats, one at each end of the two tackles controlling the car, mechanically interconnected in order to establish an angular one to one correspondence between them. The system is usable either for stoppers mounted on the traveler car or at trackway ends and is responsive to the angular position of the fall to which the power is applied. The two stoppers are always in the same state: either cleated or in free running position.

21 Claims, 4 Drawing Sheets

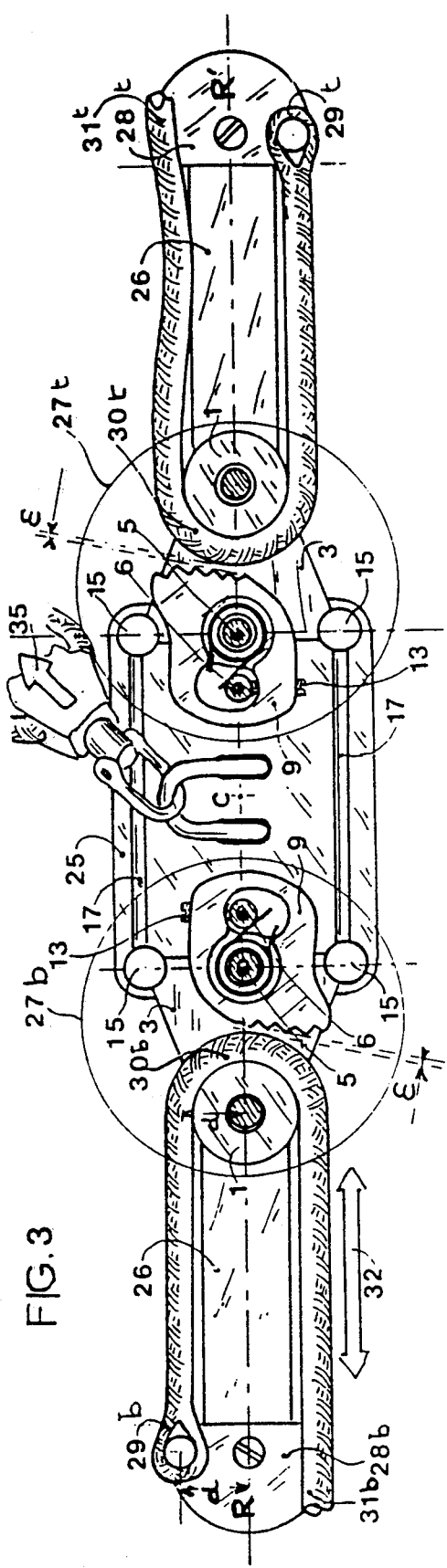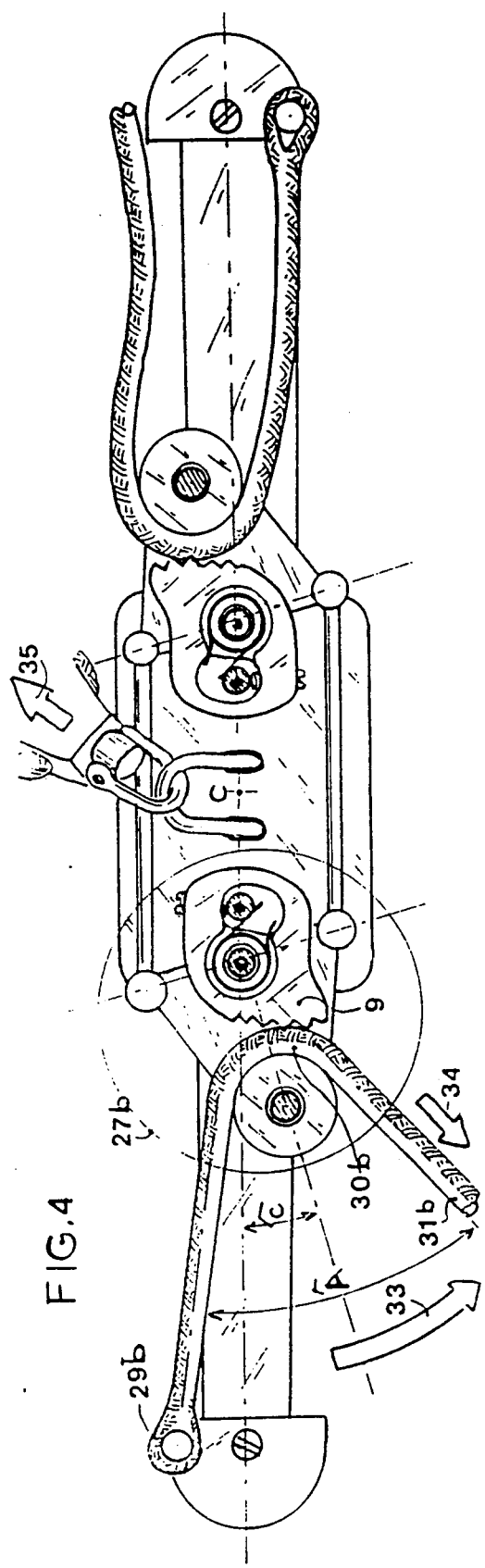
FIG.3
FIG.4

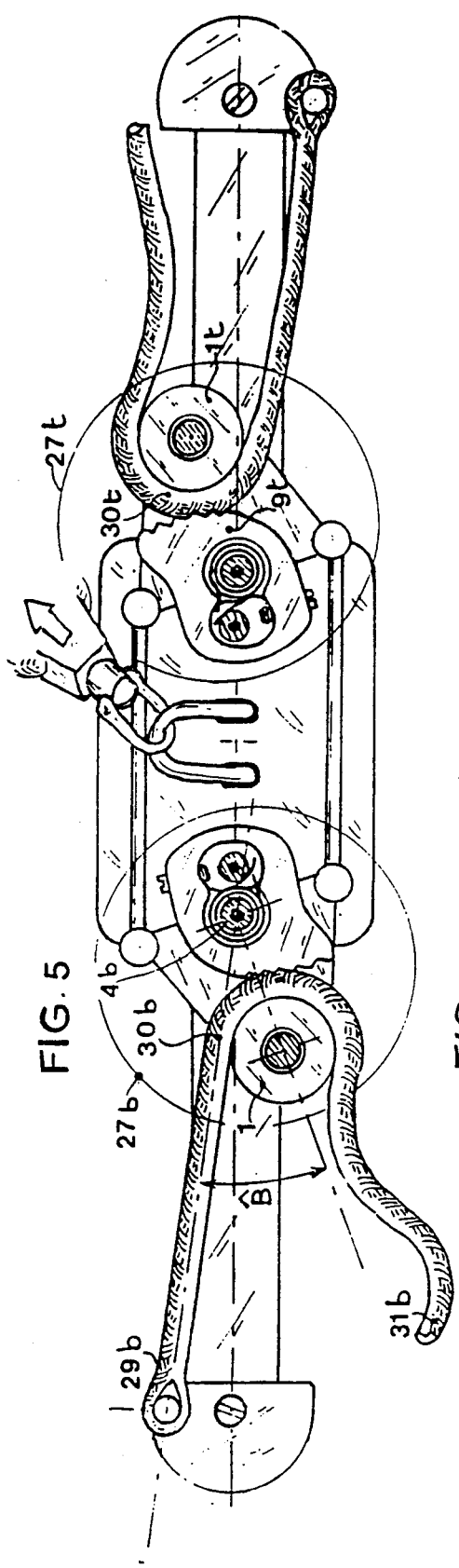
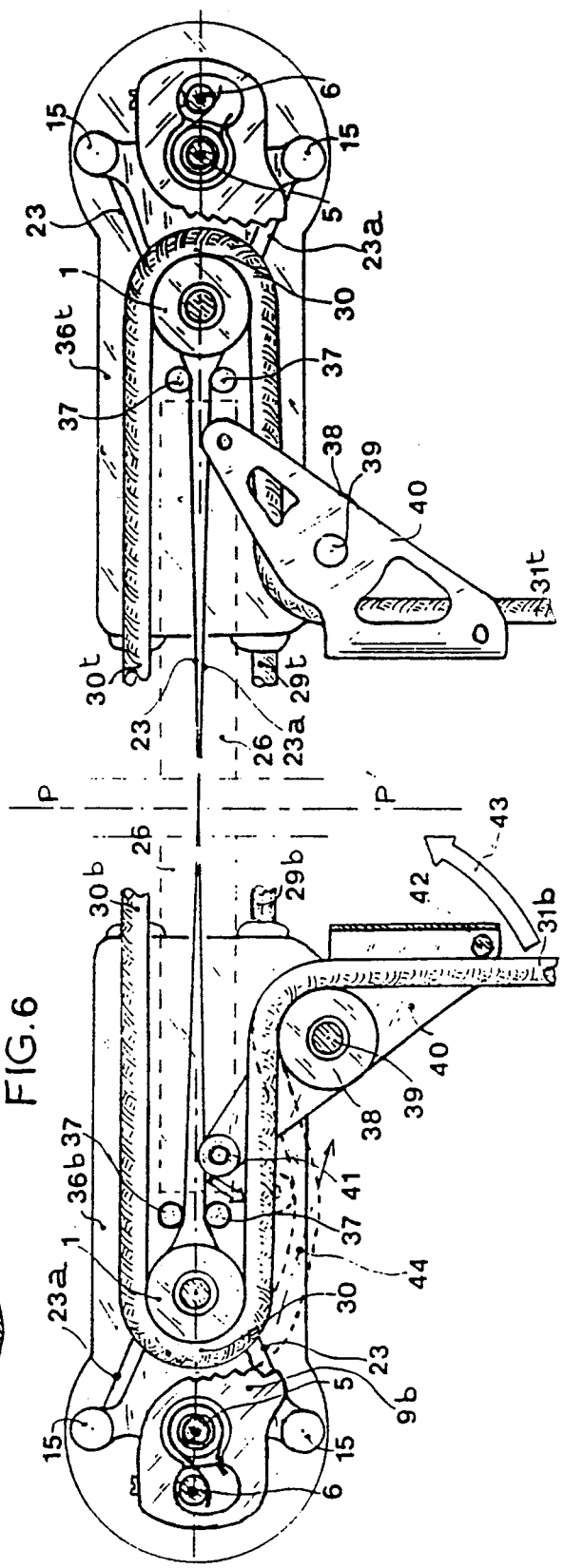
FIG.5
FIG.6

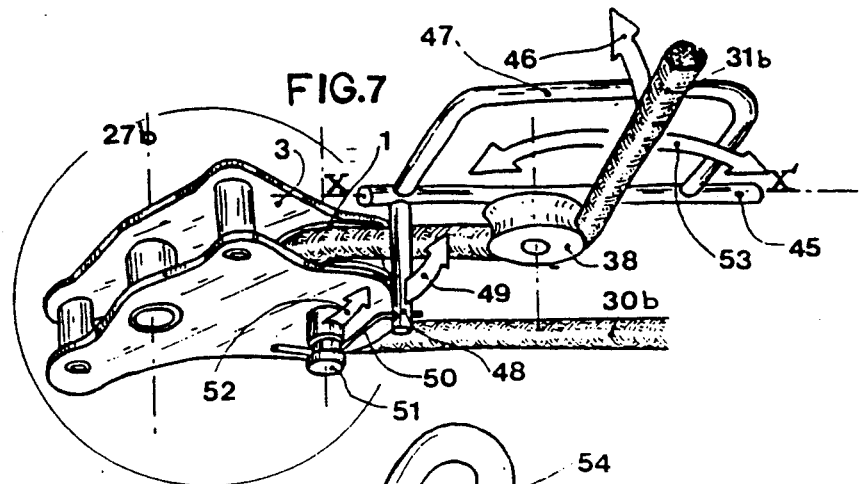
FIG.7
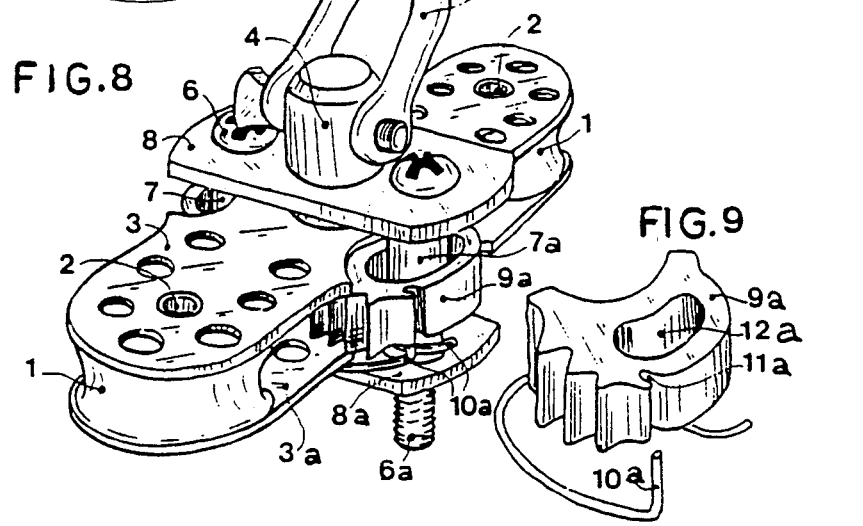
FIG.8
FIG.9
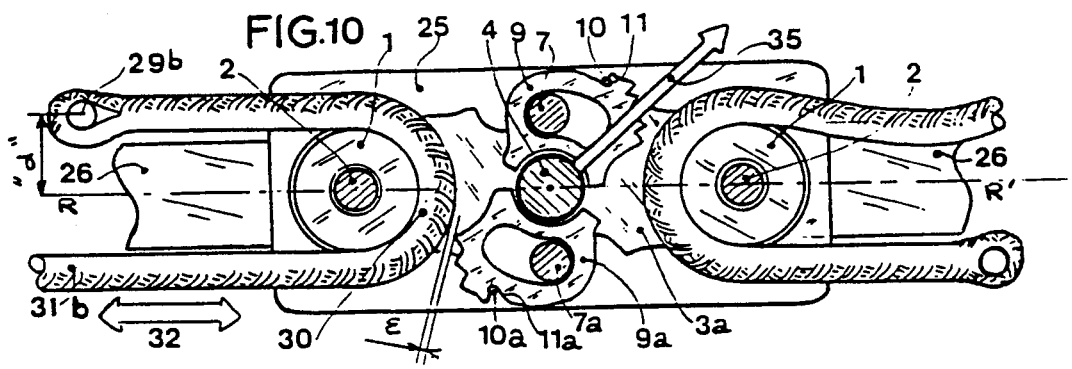
FIG.10

SYSTEM OF INTERDEPENDENT STOPPERS FOR WINDWARD SHEETING TRAVELER CARS

BACKGROUND OF THE INVENTION

In order to obtain the maximum speed of a sailboat for any particular wind or sea condition, it is necessary to position with accuracy the boom which controls the shape and the orientation of the mainsail.

For this purpose, the mainsheet tackle which connects the boom with the boat is attached at its lower extremity to a traveler car which is movable along a trackway mounted transversally across the boat. This traveler car is fitted with two tackles one on each side, their extremities being respectively fastened to the car and to the trackway ends.

At a given moment, only one tackle has to be manoeuvered, it is the tackle which counterbalances the force of the wind transmitted to it, via the sail, the mainsheet and the car.

Once the right position has been found, the control rope of this tackle has to be secured, generally in a cam cleat of conventional design which can be mounted either on the car or at trackway ends.

With such a system of opposing tackles, if you want to tack from star to portboard, you must first release the starside traveler control line, move to the portside of the boat to operate the portboard tackle and secure it.

This is a tricky operation at a moment when heel changes from side, when boom swings over the crewmen's heads and when the crew has to sit on the other side of the boat to counterbalance by its weight the new heel.

It is still more difficult with only one man on board who has to finely control the tiller at that moment and who is eventually holding the main sheet.

To our knowledge, several solutions to the problem of manoeuvering the cleats from the sole windward side have been proposed, with the cleats only fitted on the traveler car and not at trackway ends. Several ways have been explored.

The U.S. Pat. No. 4,147,121 is based upon the principle of a sliding cleat opener: a sliding part of the traveler car on which are mounted the cleats and the end pulleys of the tackles is moved by the relative force existing between the mainsheet and the windward tackle. The jaws of the leeside cleat are then pushed against a finger fastened in fixed relation to the traveler and automatically opened.

This patent is extended to any solution using means to open a cam cleat by a physical contact with the cams. It is based on the "cleat opener" principle.

The German patent 30 44 492A is based upon the principle of a rocking structure pivoting in the middle of the traveler car with its axis transversal to the track, the ends of said structure being engaged under the falls of the two tackles between the tackle pulleys and the cam cleats, in such a manner that if by example, the fall is tightened from the portboard side, it lowers the portboard end of the structure and can be inserted in the cleat, whereas the starboard side of the structure has pivoted well above the starboard cam cleat, preventing the starboard fall to be cleated and having eventually pushed it out of the cleat. It is a "rope lifter" principle.

Both ways have the disadvantage that, by inherent design, only one fall is cleated at a time, the windward one, and this can be dangerous when sailing off the wind. At this course, the direction of wind can suddenly change, throwing the traveler car against its stop without limiting the boom swing.

A second disadvantage is the inability to easily use these principles when the stoppers are to be mounted at track ends.

A third disadvantage is that these designs are not very flexible and need several models to cover a range of cars generally different by only their length; moreover, they are not able to cover easily a combination of two or several cars, often used for curved tracks or to increase the working load.

It is therefore clearly desirable to have a safer and more flexible system for automatic stoppers.

BRIEF SUMMARY OF THE INVENTION

The invention seeks to overcome the foregoing disadvantages by the provision of a system of two identical stoppers using a minimum of functional parts, therefore of low cost and reliable.

These stoppers are linked by rods or by cables, a very economical way to adapt the system to cars or tracks of different lengths.

Both stoppers are always in the same state, so that, if one is cleated, the other is also cleated and both falls are gripped by both cleats. This makes sailing off the wind very safe.

A stopper according to the invention comprises a pulley around which the fall of the tackle controlled by the stopper runs, said pulley being a part of a frame pivoting on a trunnion which is mounted either on the traveler car or at track ends, depending on the tackle disposition chosen by the boat architect. We will call "support" the part of the boat on which the trunnion is mounted.

Inside the frame is a cleat, the rest position of which is defined relatively to the support, said pivoting frame being able to have two angular positions.

A first angular position in which said pulley is sufficiently far from said cleat to let the fall of the tackle, controlled by this stopper, freely pass around the pulley, allowing to move to and fro the traveler car to position it with accuracy along its trackway.

We will call it: the free running position.

A second angular position in which said fall passing around said pulley is in contact with the cleat, initiating a cleat engaging position which will be confirmed by the force exerted by the sole traveler car under the action of wind, as soon as fall will be released.

We will call it: the cleating position.

Shifting from one position to another being controlled by the angle formed by the manually tensioned part of fall with the support.

As this operation does not necessitate to look at the stopper, it is faster than the operation consisting in inserting a rope in a conventional cam cleat.

The mechanical link between the two stoppers is simply made by one or two connecting rods articulated on the frame.

The same result can be obtained with flexible cables.

This solution is particularly suitable when stoppers are mounted at the trackway ends, especially when the distance between stoppers is great or when the track is curved. In these cases, cables will preferably run inside the trackway when the latter, generally extruded, presents a non obstructed channel.

The rod linked version is particularly suitable when the two stoppers are fitted on the traveler car, but it can also be used when the stoppers are fitted at the trackway ends, provided there is a sufficiently large channel inside the track.

The various features of novelty which characterize the invention are pointed out with particularity in the claims annexed to and forming a part of the disclosure.

For a better understanding of the invention, its operating advantages and specific objects attained by its use, reference should be had to the accompanying drawings and described preferred embodiments of the invention.

IN THE DRAWINGS

FIG. 3 is a top plan view of the two stoppers mounted on a traveler car and mechanically linked by two connecting rods. The upper cheeks have been taken out to show the relative positions of the elements in the free running position;

FIG. 4 is the same type of view, but the leading fall (portboard) makes an angle with the track axis, both stoppers are ready to be cleated;

FIG. 5 is the same type of view, but the leading fall has been released and both stoppers are cleated;

FIG. 6 is a top plan view of two stoppers mechanically linked by two cables. The stoppers are mounted at trackway ends and are in the same state as in FIG. 3;

FIG. 7 is a perspective illustration of a way to initiate the cleating by an upward angular displacement of the fall;

FIG. 8 is a perspective illustration of a unitized stopper. Both units have been unitized in one by means of common cheeks. Mainly devoted to dinghies and small boats;

FIG. 9 is a perspective illustration of a toothed cleat to be used in the unitized stopper;

FIG. 10 is a top plan view of a unitized stopper, in the same state as in FIG. 3. The upper cheek has been taken out to show the inside elements in the free running position.

DESCRIPTION OF A SPECIFIC EMBODIMENT

Figure 1:
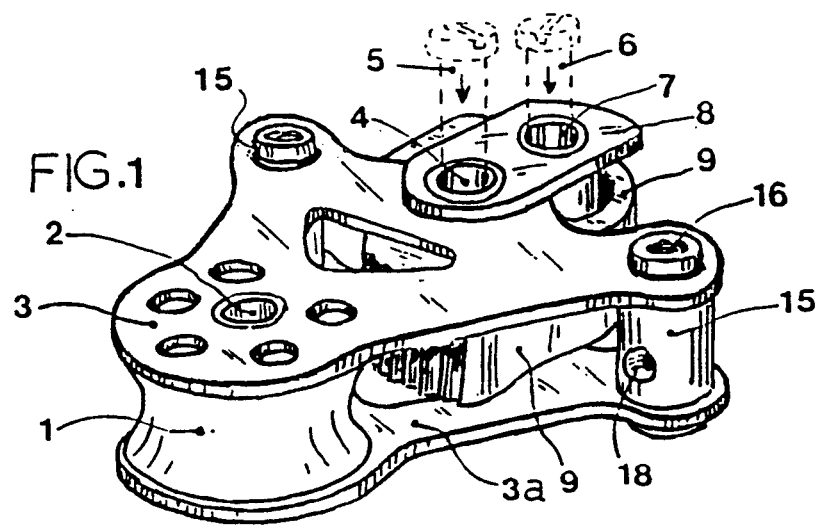
FIG. 1 is a perspective illustration of a stopper according to the invention.
Figure 2:
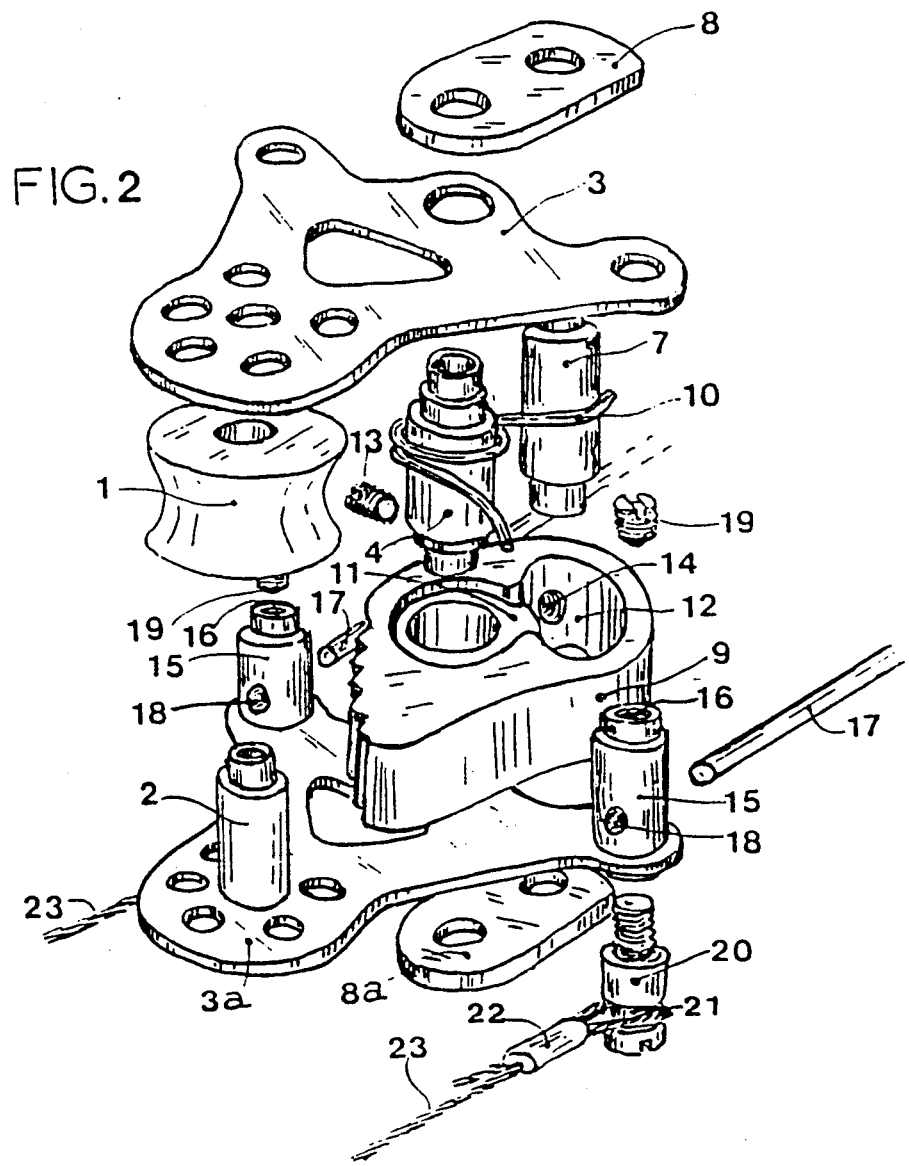
FIG. 2 is an exploded view of the same stopper also showing how the linkages can be fastened to it.

FIGS. 1 and 2 are perspective illustrations of a stopper according to the invention. The pulley 1 freely rotates on an axle 2 perpendicularly mounted between two cheeks 3, 3a.

At a distance of the pulley axle 2, and parallel to it, is a second axle called trunnion 4 on which the "frame" which comprises the pulley 1, the axle 2 and the two cheeks 3, 3a can freely pivot.

Trunnion 4 is tubular in order to receive a first securing screw 5. A second securing screw 6 passes through a tubular strut 7 parallel to trunnion 4.

Tubular strut 7 and trunnion 4 are connected at their ends by two connecting plates 8 and 8a.

A toothed eccentric cleat 9 freely pivots on trunnion 4. It is spring loaded in direction of pulley 1 by a spring 10 concentric to trunnion 4. Spring 10 is located in a cylindrical cavity 11 of cleat 9. Spring 10 rests at one end on the inner wall of the cylindrical hollow cavity 11 of cleat 9 and at the other end on strut 7.

Cleat 9 comprises a C shaped hole 12 in which strut 7 can freely move.

The extremities of this hole define, when in contact with strut 7, the limits of the angular movement of cleat 9, especially the rest position of cleat 9 which has to be defined with reference to the "support" on which are secured trunnion 4 and strut 7.

If, for any reason, for example the use of a rope with a diameter different from the one initially expected, it was necessary to modify the rest angle of cleat 9, a set screw 13, screwed in the tapped hole 14, the extremity of which rests directly on strut 7, would allow an accurate angular setting of cleat 9.

Symmetrically about the plane passing by the axis of pulley 1 and trunnion 4 and in front of trunnion 4 are two driving struts 15 which freely pivot on the two cheeks 3, 3a. Their use is to receive the extremities of the connecting means linking the two stoppers of the system. For that, they are provided with tapped longitudinal holes 16 and transversal holes 18.

Owing to the symmetry of its design, a unique type of stopper can be used on starboard or portboard, mounted on the traveler car or at trackway ends as will show the following figures.

Generally, the aftergoing description in which tackles are described will represent for the sake of clarity tackles having a power purchase of 2:1.

Of course, the present invention equally applies to tackles having a power purchase of more than 2:1. The condition is that the last block of the tackle must be a stopper according to the invention.

FIG. 3 illustrates a system according to the invention in which the two stoppers are mounted at traveler car ends.

Traveler car 25 slides on trackway 26, by means of rollers or balls not represented in the drawing, and is fitted with two identical stoppers according to FIGS. 1 and 2 which are referenced as a whole in circles 27b and 27t, b for portboard, t for starboard. (In French: b for "babord", t for "tribord").

Stoppers 27 are symmetrically fitted about the center C of the car 25, their securing screws 5 and 6 being aligned on the longitudinal axis of said car.

Both stoppers 27 are linked by two connecting rods 17 secured to the driving struts 15, but it is evident that only one connecting rod should be sufficient, although less reliable.

Length of rod 17 is equal to the distance between trunnions 4 axis, so that the planes containing the axles of trunnions and of driving struts are always parallel. This means that at any angle, the stoppers are symmetrical about an axis normal to the car in its center C.

Detail of the articulation of connecting rods is clearly shown at bottom of FIG. 2.

Connecting rod 17, a simple straight rod, to be easily adapted, by cutting, to cars of different lengths, is engaged in hole 18 of the driving strut 15 and secured by a pointed screw 19 inserted in tapped hole 16.

Trackway 26 (FIG. 3) is capped at its ends by end stops 28 on which are attached the extremities of ropes 30 of the two tackles.

Ropes 30 are engaged in stoppers 27 and run parallel to track axis RR' to be respectively manoeuvered from starboard and portboard by their falls 31t, 31b.

In FIG. 3, wind is blowing from portboard side and the mainsheet pulls the car 25 in the direction of arrow 35.

The crewman who wants to move and set the car to the portboard side, hauls on fall 31b of rope 30b, as indicated by arrow 32. Fixed end 29b of rope 30b is located at such a distance "d" from track axis that, when fall 31b is manoeuvered parallel to the trackway axis RR', the portion of rope coming from the end 29b and leading to the pulley 1 is also parallel to RR'. This means that during the setting manoeuver, pulleys 1 axis are aligned on track axis RR'.

The shape of cleat 9 and the setting of set screws 13 are such that, during this manoeuver, it continuously exists a clearance "$\epsilon$" between cleats 9 teeth and the ropes 30 which pass around pulleys 1.

As nothing will touch the ropes 30 during manoeuver, traveler car 25 can be freely positioned to and fro by fall 31b.

In FIG. 4, the right setting point has been reached and the car has to be stopped. For that, the fall 31b is swung from an angle Â (see arrow 33).

Both stoppers rotate from an angle Ĉ which puts the stoppers axis on the angle Â bisector. This rotation pushes rope 30 against the teeth of cleat 9 and initiates the cleating phase.

As soon as fall 31b is released (FIG. 5), rope 30 is pinched between pulley 1 and cleat 9. The greater the effort the greater the pinching action. Such a process is well known in the art and forms no part of the invention.

FIG. 5 illustrates the system after being cleated from portboard side. The axis of part of rope 29b, 30b, the only tensioned part of both tackles, is aligned with trunnion axis 4b.

Stopper 27b makes with this alignment an angle B which is an intrinsic feature of a stopper according to the invention.

It is a value which only depends on:
the inside diameter of the pulley,
the diameter of the rope for which it has been designed,
the distance between the pulley 1 axis and the trunnion 4 axis.

As stoppers 27 are mounted symmetrically, stopper 27tis in the same state as stopper 27b. Thus, pulley 1t pushes the rope 30t against the teeth of cleat 9t which is ready to cleat instantly the rope 30t if, on account of a change of wind, car 25 was suddenly pulled towards portboard.

This is a very important feature of this invention and adds a great deal to the safety of stoppers, especially when sailing off the wind.

The manoeuver from starboard is absolutely symmetrical and does not necessitate a complementary comment.

FIG. 6 illustrates a system wherein both stoppers are fitted at trackway ends.

Only the stoppers have been illustrated, but it is possible to see the ends 29b, 30b, 29t, 30t of the ropes leading to the pulleys fixedly mounted on the traveler car not represented here.

The two stoppers are fitted on the trackway 26 axis by their securing screws 5 and 6, the pulley of one facing the pulley of the other. Thus, the system is symmetrical about a plane PP' normal to the trackway axis in its middle.

The two stoppers are linked by flexible cables 23, 23a running inside a hollow extruded aluminium alloy profile 26.

FIG. 2 shows how these cables are movably attached to stoppers.

Cable 23 is terminated by a loop formed with a sleeve 22. This loop is inserted in the groove 21 of a machined part 20 which is screwed in the leading strut 15.

Cables 23, 23a (FIG. 6) of equal length are first brought nearer by means of pins or rollers 37, to enter inside of track 26, then crossed inside the track to give to the system, in any angular position of stoppers, a symmetry about a plane PP' normal to trackway 26 in its middle.

FIG. 6 shows stoppers in the free running position as in FIG. 3, but falls 31b and 31t are deviated by sheaves 38, rotating on axles 39, so positioned that both parts of said ropes 30 leading to the stopper pulleys 1 are parallel to the trackway axis when said falls 31b, 31t are tensioned.

With such a disposition, falls 31b, 31t can be freely manoeuvered within a large angle, the bisector of which being normal to trackway.

But, in the absence of complementary means, it should be impossible to put this system in cleating position, as an angulation of fall 31b for example is of no effect on the stoppers which will always stay in free running position.

That is the reason why, in order to cleat the system, when it is wanted, two complementary cleating means are proposed.

The first one completes FIG. 6, the second is illustrated as a detail in FIG. 7.

A lever 40 (FIG. 6) pivoting on the same axle as sheave 38, can be pushed at one of its ends 42 by fall 31b when said fall is angularly displaced towards the trackway center according to arrow 43.

The other lever end is fitted with a roller 41 which pushes the part of the fall comprised between pulley 1 and sheave 38, giving to it the shape illustrated by dotted lines 44. This opens both parts of the ropes coming out of pulley 1, pushes rope 30 against cleat 9b, and leads the system to the cleated position as in FIGS. 4, 5.

FIG. 7 shows an alternate embodiment to the lever of FIG. 6. The pivoting lever 40 (FIG. 6) is replaced by a lever 45 (FIG. 7) the axle of which, XX', in fixed relation to the support, is sensibly parallel to trackway axis, close to sheave 38 and above the fall 31b turning around said sheave.

This lever moves upward when fall 31b is moved upward according to the direction of arrow 46, owing to a part 47 of lever 45, forming a sort of frame, following the vertical movements of fall 31b.

Approximately at right angles with frame 47 is another part 48 of lever 45 which moves in the direction of arrow 49 when fall 31b is upwardly moved. As part 48 is linked with stopper 27b by a linkage 50 pulling a machined part 51 inserted in the hollow axle of pulley 1, the stopper 27 rotates in direction of arrow 52 when fall 31b is moved upward, then rope 30 (FIG. 6) is pushed against cleat 9 initiating the cleating position.

As far as fall 31b does not move frame 47 upwards it can freely control the traveler car to and fro from anywhere within a wide angle such as 53. This is a very interesting feature of the system: cleating being instantly obtained from any position in simply lifting fall 31b.

FIG. 8 is a perspective illustration of a unitized embodiment of the system especially adapted for dinghies and small boats, on account of its small size and consequently low cost.

The same part references as in the foregoing versions have been chosen for parts having exactly the same function, because this version is simply a contraction of two stoppers in a double one with exactly the same features, connecting means being replaced by parts common to both stoppers.

Here, the connecting means are functionally assumed by cheeks common to the two stoppers.

The working diagrams explained in FIGS. 3, 4, 5 apply directly to this version and do not necessitate to be completely repeated.

The two pulleys 1 (FIGS. 8 and 10) freely rotate on their axles 2 perpendicularly mounted between the two cheeks 3, 3a. This frame freely pivots on an axle 4, called trunnion, the axis of which is a symmetric axis for the whole system.

Trunnion 4 is supported by two parallel plates 8 and 8a which are maintained by two tubular struts 7, 7a which let pass through the securing screws 6, 6a.

Two identical toothed eccentric cleats 9 and 9a (FIGS. 8, 9 and 10) freely pivot on the unique trunnion 4. They are spring loaded in direction of their pulleys 1 by springs 10, 10a.

These springs 10, 10a are located at the bottom of the system, between the lower cheek 3a and plate 8a, concentrically to trunnion 4.

Springs 10, 10a rest at one of their ends in a slot 11, 11a of cleats (9, 9a) and at the other end against struts 7, 7a.

Cleats 91, 9a comprise a C shaped hole 12, 12a, in which struts 7, 7a can freely move. The extremities of these holes define, when in contact with struts 7, 7a the limits of the angular movement of cleats 9, 9a, especially the rest position of these cleats, which has to be defined with reference to traveler car axis.

Each cleat 9, 9a shares its bearing on the common axle 4 with the other cleat. In fact, the bearing of each cleat on the trunnion is at most equal to 180° less its angular stroke. To mechanically maintain cleats 9 against trunnion 4, the distance between the axis of struts 7 and the axis of the trunnion 4 is such that only a small clearance exists between the struts 7 and the inner wall of the C shaped hole 12, 12a, this wall being strictly concentric to trunnion 4.

A shackle 54, the shackle bolt of which passes through a hole drilled in the trunnion, allows to fasten the mainsheet to the traveler car.

FIG. 10 is the equivalent of FIG. 3. Both stoppers are completely symmetrical about the axis of trunnion 4, with the exception of setting screws 13 which have not been illustrated in FIG. 10. All the comments written about FIG. 3 are valuable for FIG. 10 and will not be repeated. Similarity between the two stopper systems and the double stopper is such that it is not necessary to repeat illustrations and comments concerning the cleating phases which are exactly the same.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A system of two interdependent stoppers to control two opposite tackles which, in sailboats, are adapted to position a traveler car along a trackway, said system comprising:
   two stoppers, each controlling one of said two tackles and comprising at least one pulley around which a fall common to said stopper and said tackle passes, said pulley being carried by a frame pivoting on a trunnion, said trunnion being fixedly attached to a part of the boat called support in the aftergoing, and
   a cleat having a rest position in relation to said support, said pivoting frame being able to take two noticeable angular positions:
   a first angular position, in which said pulley is sufficiently far from said cleat to let said fall freely pass around said pulley: it is the free running position, and
   a second angular position in which said fall passing around said pulley is in contact with said cleat, initiating a cleat engaging position which will be confirmed by the force exerted by sole said traveler car as soon as said fall is released: it is the cleating position, shifting from one position to another being controlled by the angle formed by a manually tensioned part of said fall with said support, said system further comprising connecting means adapted to establish a one to one angular correspondence between the two said stoppers.

2. A system as claimed in claim 1, wherein said connecting means establish an angular correspondence between the two said frames in such a manner that at the free running position of one corresponds the free running position of the other and that at the cleated position of one corresponds the cleated position of the other.

3. A system as claimed in claim 1, wherein said cleats are pivoting on said support and spring loaded in direction of said pulleys.

4. A system as claimed in claim 3, wherein said cleats are toothed eccentric cams centered on the trunnion axis.

5. A system as claimed in claim 4, wherein the shape and the position at rest of said cleats are adapted for providing a very small gap between said fall passing around said pulley and said cleat, when both parts of said fall, coming out of said pulley form between them such an angle that the plane containing said pulley axis and said trunnion axis is parallel to a direction called manoeuver direction, free running of said fall being obtained from said manoeuver direction when the fall to which the power is applied is angularly displaced to close the angle between the two said parts of the fall coming out of said pulley, in crossing them eventually, cleating being obtained from said manoeuver direction by opening the angle between said parts of the fall coming out of said pulley.

6. A system as claimed in claim 5, wherein said manoeuver direction is parallel to the trackway axis.

7. A system as claimed in claim 6, wherein said connecting means are realized by a unique frame common to the two stoppers, said unique frame pivoting on a unique trunnion.

8. A system as claimed in claim 7, wherein both said cleats are pivoting on the unique trunnion axis.

9. A system as claimed in claim 8, wherein each said cleat bears on said trunnion by an inner cylindrical part and is maintained against said trunnion by a strut parallel to the trunnion axis, said strut being fixedly attached to said support and being tangential, with a small clearance, to an outer cylindrical part of said cleat, said cylindrical part being concentric to the trunnion axis.

10. A system as claimed in claim 7, wherein said trunnion is provided with attaching means for connecting the mainsheet tackle.

11. A system as claimed in claim 5, wherein said stoppers are mounted at the trackway ends.

12. A system as claimed in claim 11, wherein said connecting means are passing inside said trackway, said trackway being an extruded hollow profile.

13. A system as claimed in claim 12, wherein said connecting means are two cables with their attachment means.

14. A system as claimed in claim 11, wherein each said stopper is mounted with its manoeuver direction parallel to the trackway axis, said stopper pulley facing the pulley of the opposite stopper, the part of said fall to which the hand power is applied being deviated after said stopper in an appropriate direction for its operation by a deviation sheave so positioned that both parts of said fall leading to said stopper pulley are parallel to the trackway axis when said fall is tightened.

15. A system as claimed in claim 14, wherein a lever whose extremity is over the part of the fall coming out of said deviation sheave follows an upward rotation of the tightened said fall, the other extremity of said lever being adapted with means enabling, during this movement to open the two said falls coming out of said stopper pulley, thus leading to a cleated position.

16. A system as claimed in claim 1, wherein both said stoppers are mechanically linked by at least one rigid connecting rod articulated on said frames.

17. A system as claimed in claim 16, wherein the length of said connecting rod is equal to the distance between the two trunnion axes.

18. A system as claimed in claim 1, wherein the said frame is symmetrical about a plane perpendicular to the trunnion axis and about a plane containing the pulley and trunnion axis.

19. A system as claimed in claim 18, wherein the articulation points of said connecting means are not far from a plane containing the trunnion axis, said plane being normal to the plane containing the trunnion and pulley axis.

20. A system as claimed in claim 1, wherein said pivoting frame comprises two parallel cheeks joined by an axle on which said pulley rotates.

21. A system as claimed in claim 1, wherein said stoppers are mounted at the traveler car ends, preferably on the longitudinal axis of said traveler car.

* * * * *